Jan. 10, 1939.  A. W. WESSMAN  2,143,749
FEEDER FOR THRESHERS
Filed April 26, 1937  2 Sheets-Sheet 1

Inventor
Arnt W. Wessman
By (signature) Atty.

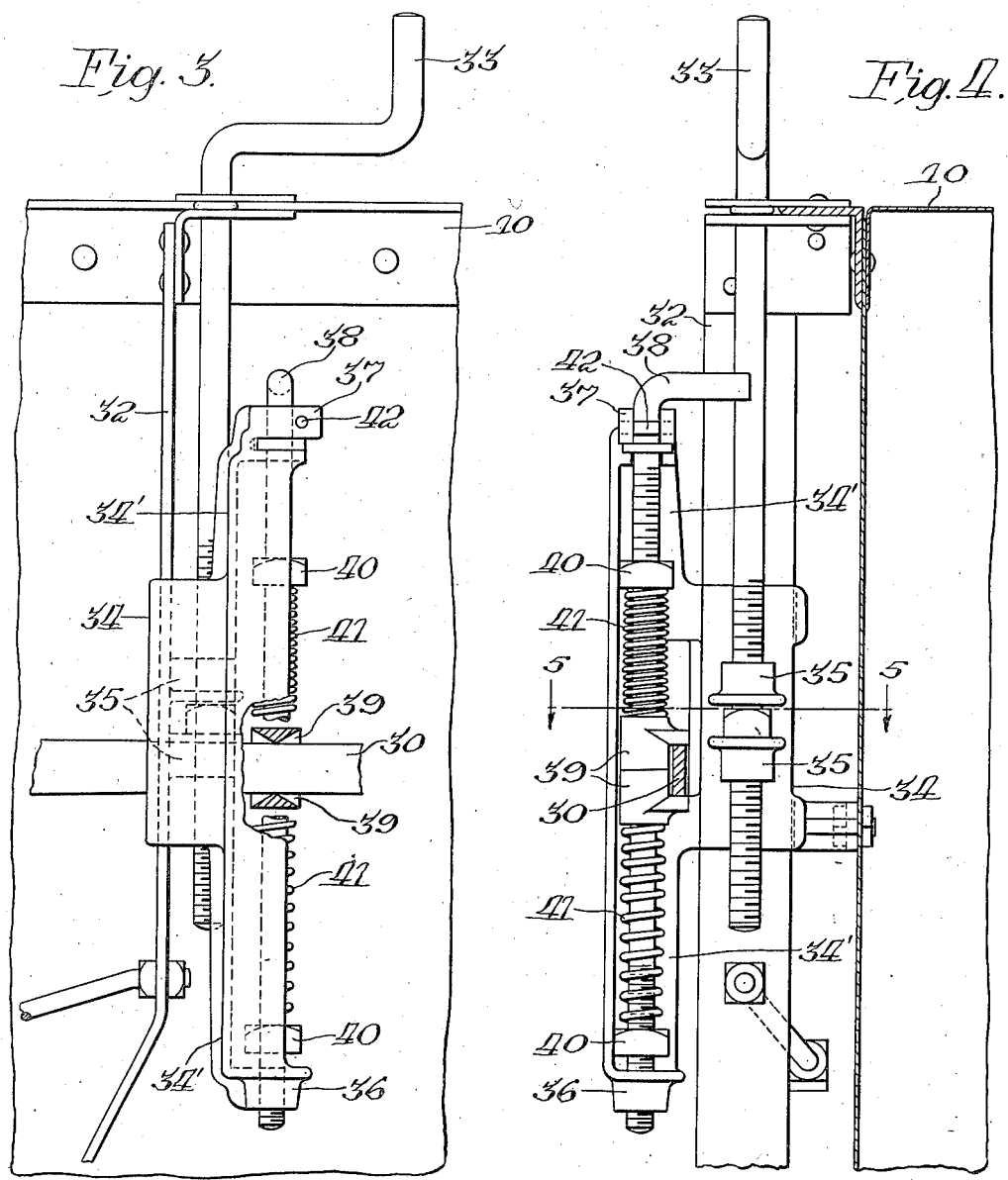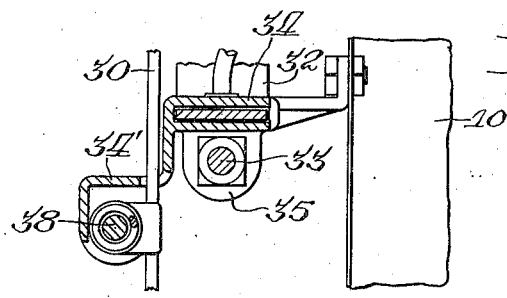

Patented Jan. 10, 1939

2,143,749

UNITED STATES PATENT OFFICE 2,143,749

FEEDER FOR THRESHERS

Arnt W. Wessman, Moline, Ill., assignor to International Harvester Company, a corporation of New Jersey Application April 26, 1937, Serial No. 138,987

10 Claims. (Cl. 198—37)

This invention relates to feeders for threshers and more particularly to means for regulating the pressure on the upper distributing mechanism of the feeder.

It is common practice in threshers to provide a feeder having upper and lower distributing mechanisms and a clutch controlled feeder conveyor delivering material to be threshed between the upper and lower distributing mechanisms. One of the problems in thresher feeders has been obtaining proper adjustment and pressure on the upper distributing mechanism or distributing rakes for different kinds of grain. For very wet or tough straw, it is desirable to have the distributing rakes operating in paths comparatively close to the lower distributing mechanism. At the same time it is also desirable to have a somewhat increased pressure on the distributing rakes to maintain their lower position for a longer period before they raise to disengage the clutch on the feed conveyor.

It is, therefore, a principal object of this invention to provide means for regulating the pressure on the distributing rakes or upper distributing mechanism.

Another important object is to provide means that are simultaneously adjustable for varying the downward pressure on distributing rakes inversely with the upward pressure thereon.

Another object is to provide means to govern the yieldability of the rakes according to the kind of grain.

Still another object is to provide means for governing the interval before disengagement of the feed conveyor clutch.

Briefly, these and other important objects are achieved by providing in a feeder for a thresher having upper and lower distributing mechanisms, and a clutch controlled feed conveyor, means for positioning the upper distributing mechanism with respect to the lower. This means may be in the conventional form of the rockshaft extending transversely across the thresher for supporting the upper distributing mechanism. A lever provided at the end of the rockshaft carries a member for controlling the feed conveyor clutch. Near its opposite end, the lever is adjusted by a rake positioning means carried by the thresher body, all of which is more or less conventional construction.

Carried by the rake positioning means are a pair of oppositely-disposed resilient adjusting means adapted to abut the lever on both sides. These adjusting means are simultaneously adjustable and the resiliency of one varies inversely with the resiliency of the other upon adjustment thereof. By this means, pressure on the lever from both directions is obtained for regulating the pressure on the upper distributing mechanism or rakes.

A further understanding of the advantages and objects of the invention will be had from the following detailed description of the structure shown in the accompanying sheets of drawings, in which:

Figure 3 is an enlarged detailed elevational view of the rake positioning means and rake pressure regulating means shown in Figure 2 with a portion of the bracket broken away to show the means for abutting the lever from opposite directions;

Figure 4 is an end elevational view of the same structure with the lever shown in section; and Figure 5 is a transverse sectional view taken on the line 5—5 of Figure 4 showing the movability of the means with respect to the thresher body.

Figure 1:
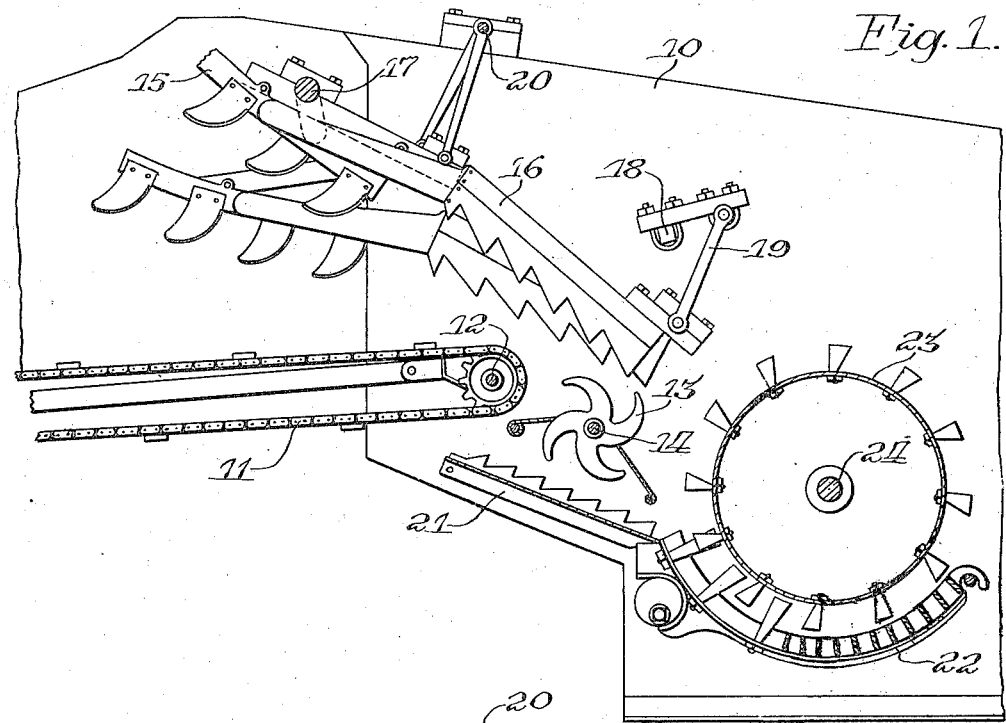
Figure 1 is a longitudinal sectional view through the feeding mechanism of a thresher.
Figure 2:
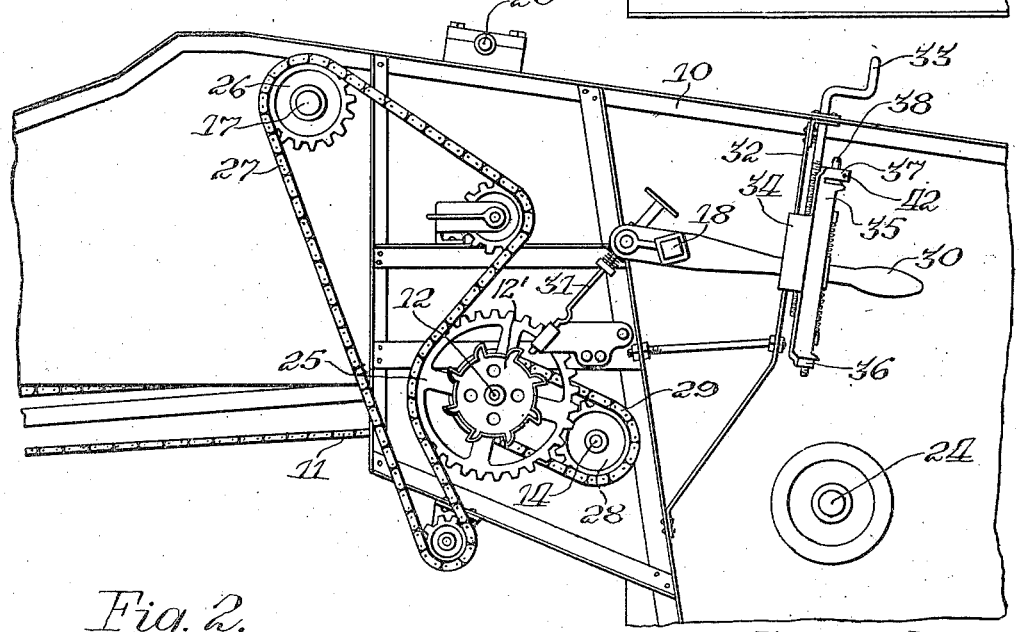
Figure 2 is a partial side elevational view of the driving connections and showing also the rake positioning means and the rake pressure regulating means.

As shown in Figures 1 and 2, the forward portion of a thresher feeder body 10 has positioned between the side walls thereof, a feed conveyor 11 driven by sprockets rotatable with a shaft 12. Rearward of the rear end of the feed conveyor 11, the thresher feeder body 10 has journaled therein a lower distributing mechanism or retarder 13 rotatable with a shaft 14. Positioned vertically above the feed conveyor 11 and the lower distributing mechanism or retarder 13 are band cutters 15 and upper distributing mechanism or distributing rakes 16. A transverse crank shaft 17 journaled in the thresher feeder body 10 supports the upper distributing mechanism at one end. A transverse rockshaft 18 positioned substantially in vertical alignment with the retarder 13 supports the rearward end of the upper distributing mechanism through the medium of arms and links 19. The arms are rigidly carried by the rockshaft and the links are pivotally attached to the arms and to the end of the distributing mechanism.

A cross shaft 20 is positioned transversely across the thresher feeder body 10 substantially centrally between the crank shaft 17 and the rockshaft 18 for supporting the central portion of the distributing mechanism. Positioned below the retarder 13 is a pan 21 connected to a concave 22 positioned below a cylinder 23. The cylinder 23 is rotatable with a shaft 24 journaled in the side walls of the thresher feeder body 10, all of which is conventional construction and is well known to those skilled in the art.

Looking now to Figure 2, the feed conveyer shaft 12 carries for rotation therewith outside the thresher body, an intermittently rotating clutch part 12' of a clutch consisting of this part and of a constantly rotating part. This clutch is similar to that illustrated in applicant's Patent No. 1,878,922, September 10, 1932, although it will be understood that any suitable form of clutch mechanism may be utilized for the present purposes. The specific type of clutch construction forms no part of the present invention beyond its correlative function with the distributing mechanism, and for this reason it is shown and described somewhat generally for the purpose of making clear a basis for the operation of a clutch control mechanism, all of which is well understood by those skilled in the art.

A sprocket chain 27 is trained around the sprocket 26 and around a pair of idler sprockets and over the sprocket 25. The retarder shaft 14 carries a sprocket 28, which is driven by a sprocket chain 29 from a small sprocket carried on the shaft 12 and driven by the constantly rotating member of the clutch.

Thus it will be seen that the feed conveyor and upper and lower distributing mechanisms are simultaneously driven. The cylinder 23 is driven by a belt, not shown, as is conventional.

It will be understood that the crank 17 is driven from the cylinder shaft 24 by a pulley drive on the opposite side of the machine, as is conventional. It will be further understood that the cylinder shaft 24 is driven from a source of power, not shown, as is well known to those skilled in the art.

The feed conveyor shaft 12 and retarder shaft 14 are driven by the chain 27 and the sprocket 26 on the crank shaft 17 and by the chain 29 driven by the constantly rotating member of the clutch. The feed conveyor shaft 12 is driven by the intermittently rotating member of the clutch and continues to drive as long as the constantly rotating member and the intermittently rotating member are engaged.

It will be apparent thus far that material is conveyed by the conveyor 11 between the upper and lower distributing mechanisms 16 and 13, respectively, the bands around the material being cut by the band cutting mechanism 15. The material is distributed by the retarder and rakes and passes therebetween to be threshed by the cylinder 23 and concave 22. At times the cylinder 23 may become clogged with material, and it is undesirable to have more material fed thereto by the conveyor 11 until the cylinder is cleared.

It is also desirable to regulate the pressure in the upper distributing mechanism according to the kind of material being passed therethrough. For this purpose a rake positioning means is provided on the thresher having a member cooperating with the feed conveyor clutch for disengaging the same when the cylinder 23 becomes clogged. Also cooperating with the rake positioning means are means for regulating the pressure on the rakes 16 for determining the amount of material necessary between the retarder and the rakes for raising the rakes to disengage the feed conveyor clutch.

The purpose of the rake positioning means is to determine the proximity of the clutch controlling member to the intermittently rotating member on the feed conveyor clutch.

In a preferred construction, the rake positioning means includes a lever 30 rigidly carried by the rockshaft 18 outside the thresher body. At the forward end, the lever 30 carries a clutch controlling member 31. The intermittently rotating member of the clutch is provided with means adapted to be engaged by the clutch controlling member 31, as will be hereinafter described.

As best shown in Figure 2, the rake positioning means preferably comprises a substantially vertical member 32 secured to the side wall of the feeder body 10. The upper end of the member is provided with a bent-over portion and carries an adjusting crank 33. The adjusting crank 33 is rotatable and prevented from axial movement in the member 32. A bracket 34 is associated with the adjusting crank 33, being slidably carried by the thresher on the vertical member 32, and having a pair of spaced, aligned ears 35 through which the adjusting crank 33 extends. An internally threaded adjusting member, in the form of a nut, is positioned between the ears 35 being threaded on the adjusting crank 33 and prevented from turning by engaging a portion of the bracket 34. The bracket 34 is provided with an opening through which the lever 30 extends, the lever being engaged by the bracket 34 at a point substantially mid-way between its end and its point of connection with the rockshaft 18.

It will be apparent from an examination of Figures 2, 3 and 4, that the adjusting crank 33 may be rotated to adjust the position of the bracket 34 on the vertical member 32, which adjusts the lever 30 and the rockshaft 18. By this means, the upper distributing mechanism 16 is enabled to operate in paths more or less distant from the lower distributing mechanism 13. At the same time, the clutch controlling member 31 is positioned closer to, or farther from, the intermittently rotating member of the conveyor clutch. By this means, the rakes 16 may be positioned according to the type of material to be distributed thereby. If the material is wet or tough, the adjusting crank 33 is rotated to adjust the rake 16 to operate in paths comparatively close to the retarder 13 to provide for a better distribution of the material. At the same time as the lever 30 is adjusted downwardly, the clutch control member 31 is moved upwardly and farther away from the intermittently rotating clutch member, thus allowing the feed conveyor to operate for a longer period before the clutch is disengaged.

The rake pressure regulating means, as best shown in Figures 3 and 4, comprises a bracket 34' preferably cast integral with the bracket 34 and forming a portion thereof. As best shown in Figure 4, the lever 30 extends through the opening, hereinbefore referred to, between the bracket portions 34 and 34'. The bracket or bracket portion 34' is provided at opposite ends with a pair of ears 36 and 37. The lower ear 36 is apertured, and the upper ear 37 is bifurcated for a purpose to appear presently. Carried by the bracket 34', positioned between the ears 36 and 37 and engaging both sides of the lever 30, are a pair of oppositely disposed resilient adjusting means. The adjusting means comprise a threaded member 38, a pair of oppositely disposed sleeve members 39, having lugs formed thereon adapted to engage both sides of the lever 30, a pair of adjusting members 40 threaded on the threaded member 38 adjacent opposite ends thereof and inwardly of the ears 36 and 37, and a pair of compression springs 41, one between each adjusting member 40 and each sleeve member 39. A pin 42 is provided in the apertured ear 37 for holding the threaded member 38 in place in the bracket 34'.

A particular feature of the invention is the unit construction of the resilient adjusting means and the adaptability thereof to quick and easy installation in the bracket 34'. The sleeve members 39, adjusting members 40, and the compression springs 41 may be positioned on the threaded member 38, and the resilient adjusting means, as an entirety, may be positioned in the bracket 34' by inserting the lower end thereof in the apertured ear 36, slipping the sleeve members 39 over the lever 30 and placing the upper end thereof in the bifurcated ear 37 and inserting the pin 42. The adjusting members 40 engage the bracket 34' to prevent their turning when the threaded member 38 is turned to regulate the pressure on the rakes 16.

In the operation of the thresher, the operator first determines the condition of the material to be threshed. The rake positioning means and the rake pressure-regulating means are adjusted accordingly. If the material is light or dry, the adjusting crank 33 is utilized to adjust the rockshaft for positioning the upper distributing mechanism 16 to operate in paths comparatively far from the lower distributing mechanism 13. It will be apparent, of course, that if such is the case, the clutch controlling member 31 on the lever 30 will be brought closer to the intermittently rotating clutch member. Also, the threaded member 38 is turned to regulate the compression on the compression springs 41, the compression on the upper spring being decreased, while the compression on the lower spring is increased. This arrangement permits easier raising of the distributing mechanism.

The above described adjustments are desirable when light or dry material is being threshed. In as much as the cylinder 23 can more easily accommodate light or dry material, more material can be distributed thereto by the upper and lower distributing mechanisms and a light upward pressure caused by the material between the two distributing mechanisms will raise the upper distributing mechanism to move the clutch controlling member 31 downwardly into engagement with the intermittently rotating clutch member 12', which will stop the feed conveyor 11. The upper and lower distributing mechanisms and the cylinder 23 continue to operate until the cylinder becomes cleared, whereat the upper distributing mechanism will move downwardly and driving engagement will be established to the feed conveyor.

However, in threshing wet or tough material, it is desirable, as has been previously mentioned, to adjust the rockshaft 19 so that the upper distributing mechanism 16 operates in paths comparatively close to the lower distributing mechanism 13 to provide for a more thorough distribution of the material before it reaches the cylinder 23. In that case, the adjusting crank 33 is turned to move the lever 30 downwardly, which moves the clutch controlling member 31 farther away from the intermittently rotating clutch member. Also, the threaded member 38 is turned to increase the compression on the upper spring 31, while decreasing the compression on the lower spring. With these adjustments effected, material is distributed more or less evenly and sparingly to the cylinder 23. In that case, the cylinder is not so apt to become clogged, and consequently, it is not necessary that the rake 16 be raised.

It is also necessary to have the downward pressure on the rakes greater for tough or wet material than for light or dry material, as it is more difficult to distribute tough or wet material.

It will be apparent from the foregoing description that a simple and effective mechanism has been provided for positioning the rakes and regulating the pressure thereon.

If it should at any time become necessary to replace the rake pressure regulating means, it is necessary merely to remove the pin 42 from the bifurcated ear 37. The entire regulating means may then be removed from the bracket 34'. It will be understood that the sleeve members 39 may be made in one piece, they being shown in the present disclosure as two separate members merely to facilitate their removal from the lever 30.

It will be understood that the pin 42 may be replaced with any other means for securing the threaded member in the bifurcated ear 37.

It is the intention of the applicant to cover all such changes and modifications of the present invention as do not depart from the spirit and scope thereof as defined in the appended claims.

What is claimed is:

1. In a device for regulating the pressure on the distributing rakes of a thresher feeder including a rockshaft for supporting the rakes and a lever rigidly carried thereby, the combination with the lever, of a bracket carried by the thresher, and a rake pressure regulating means carried by the bracket, said means comprising a threaded member journaled in the bracket, a pair of adjusting members threaded on the threaded member, a pair of sleeve members carried by the threaded member between the adjusting members and abutting opposite sides of the lever, and a compression spring carried by the threaded member between each adjusting member and each sleeve member, whereby the compression on one spring varies inversely with the compression on the other upon angular movement of the threaded member.

2. In a device for regulating the pressure on the distributing rakes of a thresher feeder including a rockshaft for supporting the rakes and a lever rigidly carried thereby, the combination with the lever, of a bracket carried by the thresher feeder, a pair of ears on the bracket, and a rake pressure adjusting means carried by the bracket, said means comprising a threaded member carried in the ears of the bracket, a pair of adjusting members carried by the threaded member engaging the bracket, a sleeve member carried by the threaded member between the adjusting members and abutting opposite sides of the lever, and a compression spring carried by the threaded member between each adjusting member and the sleeve member, whereby the compression on one spring varies inversely with the compression on the other upon angular movement of the threaded member with respect to the adjusting members and the bracket.

3. In a device for regulating the pressure on the distributing rakes of a thresher feeder including a rockshaft for supporting the rakes and a lever rigidly carried thereby, the combination with the lever, of a bracket carried by the thresher feeder, a pair of ears on the bracket, and a rake pressure adjusting means carried by the bracket, said means comprising a threaded member carried in the ears of the bracket, a pair of adjusting members spaced apart on the threaded member and engaging the bracket, a pair of sleeve members carried by the threaded member between the adjusting member and abutting opposite sides of the lever, and a compression spring carried by the threaded member between each adjusting member and each sleeve member, whereby the compression on one spring varies inversely with the compression on the other upon angular movement of the threaded member with respect to the adjusting members and the bracket.

4. In a device for regulating the pressure on the distributing rakes of a thresher feeder including a rockshaft for supporting the rakes and a lever rigidly carried thereby, the combination with the lever, of a bracket carried by the thresher feeder, an apertured ear at one end of the bracket, a bifurcated ear at the opposite end of the bracket, and a rake pressure adjusting means carried by the bracket, said means comprising a threaded member carried in the ears of the bracket, a pair of adjusting members positioned adjacent opposite ends of the threaded member inwardly of the ears and engaging the bracket, a pair of sleeve members abutting opposite sides of the lever, and a compression spring carried by the threaded member between each adjusting member and each sleeve, whereby angular movement of the threaded member simultaneously varies the compression on each spring, and means cooperating with the bifurcated ear for removably securing the threaded member in the bracket.

5. In a device for regulating the pressure on the distributing rakes of a thresher feeder including a rockshaft for supporting the rakes and a lever rigidly carried thereby, the combination with the lever, of a bracket movably carried by the thresher feeder, a pair of ears at opposite ends of the bracket, and a rake pressure adjusting means carried by the bracket, said means comprising a threaded member carried in the ears of the bracket, a pair of adjusting members positioned adjacent opposite ends of the threaded member inwardly of the ears and engaging the bracket, a pair of sleeve members abutting opposite sides of the lever, and a compression spring carried by the threaded member between each adjusting member and each sleeve, whereby angular movement of the threaded members with respect to the bracket and the adjusting members simultaneously varies the compression on each spring, and means cooperating with one of the ears for removably securing the threaded member in the bracket.

6. In a feeder for threshers including upper and lower material distributing mechanisms, a rockshaft for supporting the upper distributing mechanism, and means associated with said rockshaft for adjustably positioning the upper distributing mechanism with respect to the lower, said positioning means including a lever rigidly carried by the rockshaft, and an adjusting crank for adjusting the lever, the combination with the positioning means, of a bracket associated with the adjusting crank, a threaded member carried by the bracket, and a pair of oppositely disposed resilient adjusting means each including a compression spring carried by the threaded member and adapted to abut the lever from opposite directions, whereby angular movement of the threaded member with respect to the bracket increases the compression on one of said springs while decreasing the compression on the other for regulating the amount of material pressure necessary between the upper and lower material distributing mechanisms to raise the upper mechanism.

7. In a feeder for threshers including upper and lower material distributing mechanisms, a rockshaft for supporting the upper distributing mechanism, and means associated with said rockshaft for adjustably positioning the upper distributing mechanism with respect to the lower, said positioning means including a lever rigidly carried by the rockshaft, and an adjusting crank for adjusting the lever, the combination with the positioning means, of a bracket carried by the thresher feeder and associated with the adjusting crank, a threaded member carried by the bracket, a pair of sleeve members carried by the threaded member and abutting opposite sides of the lever, oppositely disposed resilient adjusting means each including a compression spring carried by the threaded member at either side of and abutting said sleeve member, whereby angular movement of the threaded member increases the compression on one of said springs while decreasing the compression on the other for regulating the amount of material pressure necessary between the upper and lower material distributing mechanisms to raise the upper mechanism.

8. In a feeder for threshers including upper and lower material distributing mechanisms, a rockshaft for supporting the upper distributing mechanism, and means associated with said rockshaft for adjustably positioning the upper distributing mechanism with respect to the lower, said positioning means including a lever rigidly carried by the rockshaft, and an adjusting crank for adjusting the lever, the combination with the positioning means of a bracket carried by the thresher feeder and adapted to be adjusted by the adjusting crank, a threaded member carried by the bracket, a sleeve member carried by the threaded member and abutting opposite sides of the lever, oppositely disposed resilient adjusting means each including a compression spring carried by the threaded member at either side of and abutting said sleeve member, whereby angular movement of the threaded member increases the compression on one of said springs while decreasing the compression on the other for regulating the amount of material pressure necessary between the upper and lower material distributing mechanisms to raise the upper mechanism.

9. In a feeder for threshers including upper and lower material distributing mechanisms, a rockshaft for supporting the upper distributing mechanism, and means associated with said rockshaft for adjustably positioning the upper distributing mechanism with respect to the lower, a lever rigidly carried by the rockshaft and an adjusting crank for adjusting the lever, the combination with the positioning means, of a bracket associated with the adjusting crank, a threaded member carried by the bracket, a sleeve member carried by the threaded member and abutting opposite sides of the lever, resilient adjusting means carried by the threaded member at either side of said sleeve member and each including a compression spring abutting the sleeve member, whereby angular movement of the threaded member increases the compression on one of said springs while decreasing the compression on the other for regulating the amount of material pressure necessary between the upper and lower distributing mechanisms to raise the upper mechanism.

10. In a feeder for threshers including upper and lower material distributing mechanisms, a rockshaft for supporting the upper distributing mechanism, and means associated with said rockshaft for adjustably positioning the upper distributing mechanism with respect to the lower, a lever rigidly carried by the rockshaft and an adjusting crank for adjusting the lever, the combination with the positioning means, of a bracket associated with the adjusting crank, a pair of spaced ears on said bracket, a threaded member carried by said ears, a sleeve member carried by the threaded member and abutting opposite sides of the lever, resilient adjusting means carried by the threaded member at either side of said sleeve member and each including a compression spring abutting the sleeve member, whereby the compression on one of said springs varies inversely with the compression of the other upon angular movement of the threaded member for regulating the amount of material pressure necessary between the upper and lower distributing mechanisms to raise the upper mechanism.

ARNT W. WESSMAN.